United States Patent
Ichikawa et al.

[15] 3,668,235
[45] June 6, 1972

[54] PROCESS FOR DRYING BIS-(β-HYDROXYETHYL) TEREPHTHALATE

[72] Inventors: Yataro Ichikawa; Gentaro Yamashita; Michiyuki Tokashiki; Nobuo Suzuki, all of Iwakuni-shi, Japan

[73] Assignee: Teijin Limited, Osaka, Japan

[22] Filed: Dec. 24, 1969

[21] Appl. No.: 888,082

[52] U.S. Cl. ................................260/475 PR, 260/475 P
[51] Int. Cl. ..........................................C07c 69/82
[58] Field of Search ................260/475 PR, 475 R, 475 P

[56] References Cited

UNITED STATES PATENTS 3,590,070  6/1971  Martin et al. .....................260/475 P
3,600,430  8/1971  Martin et al. .....................260/475 PR

*Primary Examiner*—Lorraine A. Weinberger
*Assistant Examiner*—E. Jane Skelly
*Attorney*—Sherman and Shalloway

[57] ABSTRACT

Process for removing a volatile liquid medium from solid bis-(β-hydroxyethyl) terephthalate wetted with said volatile liquid, by heating said wet bis-(β-hydroxyethyl) terephthalate into a molten mass and evaporating said liquid medium. Dried bis-(β-hydroxyethyl) terephthalate containing an extremely small amount of volatile liquid can be obtained in a short time without causing degradation in the quality of the product.

5 Claims, No Drawings

PROCESS FOR DRYING BIS-(β-HYDROXYETHYL) TEREPHTHALATE

This invention relates to a process for removing volatile liquid medium from solid bis-(β-hydroxyethyl) terephthalate which has been wetted with the former, to recover dry bis-(β-hydroxyethyl) terephthalate.

Bis-(β-hydroxyethyl) terephthalate, referred to hereinafter BHET, is produced in large quantities as an intermediate product in the manufacture of polyethylene terephthalate, and has very high industrial value. Known methods for the preparation of BHET include ester-interchange between dimethyl terephthalate and ethylene glycol, and direct esterification of terephthalic acid with ethylene glycol. Also recently ethylene oxide process wherein terephthalic acid is directly reacted with ethylene oxide has been drawing much attention (for example, refer to Specification of U.S. Pat. No. 3,037,049.)

Furthermore, it is proposed recently to make BHET by reacting terephthalonitrile and water with ethylene glycol. (This process will be hereinafter referred to terephthalonitrile process.) (For example, see specification of British Pat. No.800,875.) Among those known methods, BHET of less oligomer content can be obtained from ethylene oxide process and terephthalonitrile process, particularly ethylene oxide process. In the named processes, normally the BHET-forming reaction is conducted in solvent, and the resulting BHET is optionally purified, and separated from the employed liquid reaction medium or the liquid medium used for the purification, dried, and sent to the next procedure in solid state.

However, it is extremely difficult to dry such wet, solid BHET, substantially completely eliminating therefrom the solvent used during the reaction or the liquid medium used for the purification. Because, when such wet BHET is dried under reduced pressure at relatively low temperatures such as 40°-60 C., the drying requires objectionably long time, and quality of BHET is degraded by such phenomenon as coloring, etc. Whereas, in the attempts to dry the solid BHET by heating it to relatively high temperatures, e.g., 60°-90° C., the surfaces of BHET become sticky, and the BHET tends to agglomerate into blocks before completion of drying. Thus the operability of drying is impaired and satisfactory result of drying becomes difficult to be achieved.

Accordingly, the object of the present invention is to provide a process for drying solid BHET wetted with such volatile liquid medium with simple operation and within relatively short time, without inviting qualitative degradation of the product.

Another object of the invention is to provide a novel process for recovering high quality, dry BHET of extremely little volatile liquid medium content, which is difficult to obtain through conventional reduced pressure powder drying methods.

Still many other objects and advantages of this invention will become apparent from the following descriptions.

The foregoing objects and advantages are accomplished in accordance with the subject process for removing volatile liquid medium from solid BHET which has been wetted with said volatile liquid medium and recovering dry BHET, wherein the solid BHET wetted with the volatile liquid medium is heated and fused into a molten mass, and evaporating from the molten mass the volatile liquid medium.

Hereinafter the subject process will be explained in further details.

The BHET to which the present drying process can be applied may be prepared by any of the aforementioned methods, while BHET's of less oligomer contents, such as no more than approximately 20 percent, are particularly preferred.

Crude BHET's prepared by aforesaid ethylene oxide process and terephthalonitrile process, particularly ethylene oxide process, contain relatively less amounts of oligomer as they are, and therefore are suited to be directly subjected to the drying process of this invention. Obviously, it is also permissible to first purify those crude BHET in the presence of suitable liquid medium, before applying thereto the subject drying process.

BHET can also be obtained through depolymerization of ethylene terephthalate structural unit-containing compounds, such as polyethylene terephthalate, oligomer of BHET, etc. The process of this invention is likewise applicable for drying such BHET.

The "solid bis(β-hydroxyethyl) terephthalate (BHET) wetted with volatile liquid medium" referred to in this specification signifies any BHET which is wetted with the volatile liquid medium employed during the preparation of the BHET as above-mentioned or its purification.

As the volatile liquid media conceived in the invention, for example, the following may be named:

a. Water;

b. Halogenated hydrocarbons such as chloroform, carbon tetrachloride, dichloroethane, trichloroethane, tetrachloroethane, chlorobenzene, bromoform, dibromoethane, bromobenzene, fluorobenzene,$\alpha,\alpha',\alpha''$-trifluorotoluene, etc.;

c. Ketones such as acetone, methyl ethyl ketone, methyl isopropyl ketone, diethyl ketone, cyclohexanone, methyl isobutyl ketone, 4-methyl-2-pentanone, etc.;

d. Ethers such as diethyl ether, diisopropyl ether, dibutyl ether, tetrahydrofuran, dioxane, etc.;

e. Alcohols such as methanol, ethanol, propanol, isopropanol, butanol, pentanol, ethylene glycol, propylene glycol, etc.;

f. Amides such as NN-dimethylformamide, NN-dimethylacetamide, NN-tetramethyleneformamide, NNN'N'-tetramethylurea, hexamethylphosphonamide, N-alkylpyrrolidone, etc.;

g. Organic acid esters such as methyl acetate, ethyl acetate, butyl acetate, methyl propionate, ethyl propionate, butyl propionate, methyl phthalate, etc.;

h. Organic cyanides such as acetonitrile, propionitrile, butyronitrile, benzonitrile, succinonitrile, adiponitrile, etc.;

i. Aliphatic hydrocarbons such as pentane, hexane, heptane, octane, nonane, decane, etc.;

j. Alicyclic hydrocarbons such as cyclopentane, methylcyclopentane, cyclohexane, cyclohexene, methyl-, ethyl-, or isopropyl-cyclohexane, cyclooctane, cyclooctadiene, cyclododecatriene, etc.; and k. Aromatic hydrocarbons such as benzene, toluene, ethylbenzene, isopropylbenzene, o-xylene, m-xylene, p-xylene, p-cymene, diethylbenzene, methylnaphthalene, ethylnaphthalene, etc.

Among the named volatile liquid media, particularly those having boiling points at atmospheric pressure not lower than 40° C. but below the boiling point of ethylene glycol are conveniently subjected to the present drying process. Inter alia, benzene, toluene, and xylene in above (k) group are preferred liquid media both as the solvents used in the synthesis of BHET by ethylene oxide process, and as purification media of crude BHET, which furthermore can be very smoothly evaporated and removed from the solid BHET in the drying process of this invention. Incidentally, use of ethylene glycol or liquid media having boiling points higher than that of ethylene glycol is not advantageous, since under the conditions as will evaporate and remove such liquid media, concurrent evaporation of ethylene glycol may take place, enhancing the tendency for oligomerization of BHET. The foregoing liquid media may be present in BHET singly or as a mixture of more than one medium.

BHET synthesized and/or purified in the foregoing volatile liquid volatilizes, medium is normally separated from the excessive medium by known means of solid-liquid separation, e.g., filtration, centrifugation, etc., but is still wet with the medium after such separation. When such wet BHET is, for example, polycondensed as it is, the ethylene glycol whereby released is taken out of the polycondensation system together with said medium. Consequently, for later recovery of the ethylene glycol, it must be separated from the medium mixed therewith, which is quite cumbersome. Again if the wet BHET is stored or transported as it is, the liquid medium contained therein volatilizes, which is objectionable both from sanitary and operational standpoints. Thus it is necessary to remove the liquid medium from the wet BHET before it is sent to, for example, polycondensation step.

According to the present invention, therefore, the solid BHET wet with such volatile liquid medium as aforesaid is heated and fused into a melt, and the volatile liquid medium is evaporated from said melt. The liquid medium content of the wet BHET to which the subject invention is applicable is subject to no critical limit, while it is preferred that solid BHET containing equal amount or less of the liquid medium is treated by the subject process.

As already pointed out, when the wet, solid BHET is heated under a reduced pressure to a temperature above the boiling point of the liquid medium at said pressure, as ordinarily practiced for drying solid powder, extremely long time is required for removing the liquid medium and recovering completely dried BHET. Due to such prolonged exposure to heat, furthermore, the quality of BHET is degraded by such phenomenon as coloring, etc., even at relatively low temperatures such as 40°–60 C. Again, if the wet, solid BHET is heated to somewhat higher temperatures, for example, 60°–90° C., the surfaces of solid BHET become sticky, which invites not only conspicuous reduction in operability of drying but also frequent reduction in drying efficiency.

In clear contrast thereto, when the wet, solid BHET is first heated and fused, and the liquid medium is evaporated from the melt in accordance with the present invention, the liquid medium can be evaporated and eliminated with high efficiency, within relatively short time. Consequently, according to the drying process of the invention, qualitative degradation of BHET is only little, recovery of the liquid medium is easy, and high efficiency drying can be performed with apparatus of simple structure.

The reason of very low rate of evaporation of the liquid medium, when the wet, solid BHET is heated under a reduced pressure at temperatures above the boiling point of the liquid medium at the reduced pressure, is, according to our views, that the liquid medium is adsorbed onto the BHET surfaces due to the unique property of BHET, and therefore it is difficult to evaporate the adsorbed liquid. Whereas, when the liquid medium is evaporated from the molten BHET in accordance with the invention, the evaporation of adsorbed liquid can be very easily performed. Thus, the subject process can dry the wet BHET at a rate of several to several hundred times greater than that of conventional, reduced pressure solid drying method.

According to the invention, the wet, solid BHET is heated, and resulting melt is maintained at temperatures not exceeding 180° C., preferably not higher than 150° C., while retaining the molten state, from which the volatile liquid medium being evaporated. The reason why the melt is maintained at temperatures not exceeding 180° C., particularly not higher than 150° C., is that, when the melt is maintained at temperatures higher than the specified temperatures, tendency of coloring or oligomerization of BHET increases.

The lower limit of the melting temperature of the wet BHET differs depending on such factors as preparation and/or refining conditions of the specific BHET, type and amount of the liquid medium, type and amount of impurities in the BHET, etc., while normally the wet BHET melts at temperatures above 90° C. In special cases, it may be fused at 70°–90° C.

As the drying apparatus for conducting the evaporation of liquid medium, for example, conventional agitation type or non-agitation type vessel, film evaporator, flash evaporator, etc. can be used. Provision of heating device in those evaporators is optional. The drying operation can be performed either batchwise or continuously, and the wet, solid BHET may be supplied into the drying apparatus in solid form to be heated and fused in the drying apparatus, or in the form of melt which has been fused in advance.

The evaporation of liquid medium in accordance with the invention can be performed within still shorter time and more completely, if the melt of the wet, solid BHET is contacted with a flow of inert gas.

The type of the gas is not critical, so far as it is substantially inert to BHET. For example, nitrogen, argon, helium, carbon dioxide, carbon monoxide, hydrogen, etc. may be used, nitrogen and carbon dioxide, particularly nitrogen, being most preferred from the standpoints of economy and safety of operation. Such inert gas may contain no more than approximately 1 percent of molecular oxygen, or mixtures of foregoing gases may be used.

The amount of inert gas to be blown into the system differs depending on the type and amount of the liquid medium to be removed, drying temperature, operating pressure, design of drying apparatus, etc. Whereas, when the vapor pressure of the liquid medium at the drying temperature is lower than the operating pressure, the amount of inert gas may be suitably so selected that the average partial pressure of the vaporized liquid medium in the gaseous mixture of the vaporized liquid medium and the employed inert gas, at the time when all the liquid medium in the BHET is evaporated, should become lower than the vapor pressure of the medium at the drying temperature. Normally preferred practice is to use such an amount of inert gas that the partial pressure of the vaporized medium in the gaseous mixture should become 30–85 percent of the vapor pressure of same medium at the drying temperature. Such is effective to raise the efficiency of apparatus and increase the recovery ratio of liquid medium. Whereas, when the vapor pressure of the medium to be removed, at the drying temperature, is higher than the operating pressure, supply of even very minor amount of inert gas remarkably increases the removing efficiency of the liquid medium. Generally speaking, the preferred amount of inert gas to be blown into the system to promote the drying effect of the subject process is such that the average partial pressure of the vaporized medium in the gaseous mixture composed of the vaporized medium and the inert gas, when the total amount of the medium to be removed is evaporated, should become not higher than 90 percent of the operating pressure. Also for the purpose of facilitating the recovery of evaporated liquid medium, it is desirable to so select the supply amount of inert gas, within the above specified range, that the partial pressure of the vaporized liquid in the gaseous mixture should become no less than 20 percent of the operating pressure.

The melt of wet, solid BHET and inert gas can be contacted by, for example, blowing the inert gas into the melt, or may be contacted in such a manner that each of the melt and the inert gas should form a continuous phase. Or, the melt may be suspended in the current of inert gas. In the first-mentioned blowing system, the blow-in position of the inert gas is not critical so far as it is into the molten BHET, but that in the vicinity of bottom of the drying apparatus is preferred for increasing the drying efficiency. For blowing inert gas into the molten, wet BHET, besides the aforementioned drying apparatuses, so-called Pachuca tank apparatus composed of a drying vessel provided with draft tube for inert gas may be employed. Whereas, for contacting the inert gas with the melt, each forming a separate continuous phase, for example, film evaporator may be used. In that case, the flows of inert gas and molten BHET may be contacted countercurrently or as cocurrents, while the latter is preferred for reducing flow rate of the inert gas as well as for increasing the drying efficiency. The inert gas can be optionally pre-heated.

The drying process of this invention is operable at any of elevated, atmospheric, and reduced pressures, regardless the use of inert gas. Preferred pressure condition is determined according to such factors as the type and amount of liquid medium contained in the wet, solid BHET to be dried, and necessity for recovering the medium, etc. Whereas, it is normally suitable to perform the drying, under elevated pressures not higher than 2 atmospheres as absolute pressure, atmospheric, or reduced pressure.

The greater is the difference between the boiling point of the liquid medium to be evaporated and the drying temperature (the latter being the higher), the shorter may be the drying time. Also the longer the drying time, more complete is the drying. However, when the BHET is exposed to such drying temperatures as above-described for a prolonged period, polycondensation thereof is induced and its quality, degraded. Therefore, in consideration of thermal stability of BHET, generally the suitable drying time ranges no longer than 10 hours, particularly no longer than 3 hours. According to the present invention, it is possible to perform satisfactory drying of the wet BHET within the above preferred time range.

Thus obtained dry melt of BHET from which the liquid medium has been removed may be sent to the next step, e.g., purification step and/or polycondensation step, as it is, or may be formed into flakes using a flaker, for example, and then sent to such a next step.

The liquid medium evaporated in the drying apparatus may be discarded, or condensed by means of a condenser or scrubber and recirculated for reuse if desired. When an inert gas is used in the drying process of this invention, the inert gas may be passed through said condenser, scrubber, or other suitable adsorbing or absorbing apparatus, to separate therefrom the liquid medium contained therein, and to recirculate the inert gas into the system. The process of this invention exhibits still additional advantage to those aforedescribed, when an inert gas is thus employed, that the loss in the inert gas is little, and the volatile liquid medium can be recovered at high recovery ratios.

Hereinafter the subject process will be explained in further particulars, referring to the working examples and controls, in which parts are by weight, unless otherwise specified.

The water content was measured by means of Karl Fischer's water content determining device. Also the degree of coloring of BHET was measured as follows: 1.5 g of sample BHET WAS DISSOLVED into pyridine to form a solution of 50 ml, and of which optical density (O.D) measured in a 5-cm cell at a wavelength of 340 m$\mu$ was used as the norm of coloring.

EXAMPLE 1

400 parts of crude BHET prepared by reacting terephthalic acid with ethylene oxide and 1,000 parts of pure water were heated to 100° C. to dissolve the former in the latter. The resulting solution was cooled to 40° C., and the precipitated BHET was separated by filtration, which was further washed with water to provide wet, refined BHET. The liquid content of the BHET was 32.4 weight percent (based on the wet BHET).

The wet BHET was charged in a glass agitation tank provided with a condenser. The tank was immersed in an oil bath maintained at 130° C., while purging the air therein with nitrogen gas, to melt the BHET. Maintaining the BHET at the molten state, the steam formed is condensed in the condenser, and withdrawn from the system. The distillation of water completed 10 minutes thereafter. Whereupon the molten BHET was withdrawn, and crystallized by cooling. The water content of the dried BHET was 0.109 weight percent, and its degree of coloring was 0.203 as O.D.

CONTROL 1

The wet, refined BHET obtained similarly to Example 1 (water content: 32.4 weight percent based on the wet BHET) was dried in a vacuum desiccator maintained at 60° C.

15 minutes were required to reduce the water content to below 10 weight percent, and the resulting dried BHET had an O.D. of 0.233.

EXAMPLE 2

40 parts of same crude BHET as used in Example 1 was heated to 50° C. together with 60 parts of refined ethylene glycol, to dissolve the former in the latter. The resulting solution was cooled to 0° C., and precipitated BHET was separated, and washed with ice-cooled refined ethylene glycol to provide liquid-containing, recrystallized BHET. A portion thereof was sampled and dried, to provide a wet BHET containing 53.2 weight percent (based on the wet BHET) of the liquid.

The liquid-containing BHET was charged in the same vessel as employed in Example 1. After nitrogen-substitution of inside atmosphere, the vessel was immersed in a bath of 140° C., to cause fusion of the BHET. When the BHET fused, the pressure within the system was maintained at 50 mm Hg by means of a vacuum pump, and evaporated ethylene glycol vapor was condensed in the condenser and withdrawn from the system.

Distillation of ethylene glycol completed 14.2 minutes thereafter. Whereupon the operation of vacuum pump was stopped and nitrogen gas was purged with air. The system was cooled, and crystallized BHET was withdrawn. The ethylene glycol contained in the BHET was extracted with water, and the quantity of ethylene glycol present in the aqueous phase was determined by means of gas chromatography, with the result of 0.201 weight percent in terms of ethylene glycol content in the dry BHET. The O.D. of dry BHET was 0.211.

EXAMPLE 3

Wet BHET prepared by the reaction of terephthalic acid with ethylene oxide and following recrystallization of the reaction product from methanol (liquid content: 23.4 weight percent, based on the wet BHET) was continuously supplied to the upper part of a drying oven at a rate of 2.4 kg/hr. The drying oven was a tank of 1.3-liter capacity, and heating was effected by the jacket and the coil within the tank. The BHET in the tank was maintained at molten state at 120° C. On the upper part of the tank, a heat exchanger was provided at such a location as would cause no refluxing of condensed methanol into the tank. Nitrogen gas was constantly passed through the tank, and the operation was run under atmospheric pressure. As soon as the liquid-containing BHET was fed into the drying oven, the methanol therein was flash evaporated, and the BHET, melted. The vaporized methanol was condensed in the heat exchanger and recovered.

Thus dried molten BHET was continuously withdrawn from the lower part of the drying oven at a rate of 2 liters/hr., and sent to a flaker.

Methanol in thus obtained BHET was extracted with water and quantity thereof was determined by means of gas chromatography. When converted to dry BHET basis, the methanol content of the dry BHET was 0.023 weight percent. The dry BHET had an O.D. of 0.201.

EXAMPLE 4

30 parts of crude BHET prepared by reacting terephthalic acid with ethylene oxide and 70 parts of pure water were heated to 100° C. to dissolve the former in the latter. The resulting solution was cooled to room temperature, and the precipitated BHET was separated by filtration, and washed furtherwith water to provide wet, refined BHET of a water content 32.4 weight percent (based on the wet BHET).

The wet BHET was charged into a glass agitation tank which was provided with a gas condenser and a gas inlet nozzle at the bottom, and maintained at substantially atmospheric pressure, and immersed in an oil bath of 130° C. The BHET was whereupon melted. While maintaining the BHET at the molten state, nitrogen was supplied into the tank from the bottom at a fixed flow rate, and the steam evaporated was condensed in the condenser and withdrawn from the system. The inert gas was sent into a wet type gas meter to be measured of its integrated flux, and discharged into air. 10 minutes after the operation started, the molten BHET was withdrawn, cooled and crystallized. The water content of the crystalline BHET was 0.018 weight percent. The average partial pressure of steam in the gaseous mixture discharged from the tank, as calculated from the distilled water and integrated flux of inert gas, was 0.34 atm. Also the degree of coloring of dry BHET in terms of the O.D. was 0.20.

EXAMPLE 5

40 parts of the same crude BHET as employed in Example 1 was heated to 50° C. together with 60 parts of refined ethylene glycol, to dissolve the former in the latter. The resulting solution was cooled to 0° C., and the precipitated BHET was separated, and washed with ice-cooled, refined ethylene glycol to provide liquid-containing, recrystallized BHET. A portion thereof was sampled, dried, and measured of the liquid content, which was 53.2 weight percent (based on the wet BHET).

The wet BHET was charged into the same vessel as employed in Example 1. After nitrogen substitution of the inside atmosphere, the vessel was immersed in a bath of 140° C. to cause fusion of the BHET. Upon melting of the BHET, inert gas below-specified was continuously supplied into the vessel through the inlet nozzle at the bottom thereof, while maintaining the inside pressure of the system at 60 mm Hg by means of a vacuum pump, and the vapor of evaporated ethylene glycol was condensed in the condenser and withdrawn from the system.

The vacuum pump was stopped 14.2 minutes thereafter, and the used inert gas was purged with air to eliminate the vacuum. Cooled BHET was taken out, and ethylene glycol contained therein was extracted with water. The ethylene glycol in the aqueous phase was determined by means of gas chromatography. The ethylene glycol contents calculated on dry BHET basis and the O.D. values of the dry BHET are shown in the table below.

| Example | Class of inert gas | Ethylene glycol in dry BHET (weight %) | O.D. |
| --- | --- | --- | --- |
| 5–a | He | 0.051 | 0.202 |
| 5–b | $CO_2$ | 0.072 | 0.201 |
| 5–c | $H_2$ | 0.031 | 0.203 |

EXAMPLE 6

100 parts of BHET containing 54.2 weight percent (wet BHET basis) of benzene which was obtained by reacting terephthalic acid with ethylene oxide in benzene as the solvent, was charged in the same vessel as employed in Example 1, and melted in an oil bath maintained at 120° C. to be fused.

When the system was maintained at 120° C. over a period of 25 minutes, the distillation of benzene stopped. Then, the content of the reactor was taken out and the benzene content was determined by gas chromatography. The results are shown in table below.

Next, the above benzene-containing wet BHET was charged in a reactor same as used above, and melted on an oil bath.

While maintaining the BHET in molten state, nitrogen was fed into the vessel from the bottom thereof at a fixed flow rate under atmospheric pressure, and the evaporated benzene vapor was condensed in the condenser and withdrawn out of the system. The inert gas was sent into a wet type gas meter to be measured of the integrated flux, and then discharged into air. 10 minutes after the nitrogen supply started, the supply was stopped and the molten BHET was withdrawn, cooled and crystallized. The benzene content of the crystalline BHET was determined. The results are shown in the table below. The average partial pressure of the benzene vapor in the discharged gaseous mixture as calculated from the amount of benzene obtained by condensation in the condenser and the integrated flux of nitrogen gas was 0.37 atm.

A toluene-containing wet BHET synthesized with the use of toluene as solvent (toluene content being 61.5 percent by weight) was treated at 130° C. in the same manner as above. The toluene content of the resulting dry BHET is also shown in the table below.

| Example | Class of reaction medium | $N_2$ gas blowing | Medium content in dry BHET (% by weight) |
| --- | --- | --- | --- |
| 6–a | Benzene | None | 0.100 |
| 6–b | Benzene | Yes | 0.0091 |
| 6–c | Toluene | None | 0.302 |
| d | Toluene | Yes | 0.105 |

CONTROLS 2–5

The wet BHET's containing benzene and toluene as obtained in Example 6 (the liquid content being the same to that in Example 6) were each put in a vessel provided with a stirrer. Nitrogen gas pre-heated to 70° C. was charged from a lower part of said vessel, under stirring. The stirring and nitrogen gas supply were continued for 5 hours, and thereafter dry BHET powder was withdrawn. The products' benzene and toluene contents, respectively, were measured with the results given in the table below.

| Control No. | Type of Reaction Medium | Liquid Content of Dry BHET (wt. %) |
| --- | --- | --- |
| 2 | Benzene | 5.32 |
| 3 | Toluene | 8.01 |

When the wet BHET's of Example 6 were each put in a 40° C. vacuum desiccator and withdrawn 5 hours thereafter, their respective benzene and toluene contents were as given in the table below.

| Control No. | Type of Reaction Medium | Liquid Content of Dry BHET (wt. %) |
| --- | --- | --- |
| 4 | Benzene | 5.21 |
| 5 | Toluene | 6.33 |

EXAMPLE 7

In an extraction apparatus composed of a recovery section (three mixer-settlers), a purification section (eight mixer-settlers), a cooling condenser and a reflux box, the recovery and purification sections were maintained at 105° C., and the reflux box, at 100° C. From the end of recovery section, 100 parts per unit time of pre-heated toluene was continuously supplied, and from the other end of the recovery section, molten BHET obtained by reacting crude terephthalic acid with ethylene oxide was continuously supplied at a rate of 7.5 parts per unit time. The toluene solution of BHET at 105° C., as recovered at the purification section, was cooled to 100° C. in the cooling condenser, whereby separating and settling a part of molten BHET from the solution. The melt phase separated as a heavy fluid phase at the reflux box was returned to the purification section and refluxed. Thus the toluene phase and molten BHET phase were continuously contacted countercurrently in the purification section. The toluene phase separated from the molten BHET phase at the reflux box was continuously withdrawn from the system, and allowed to cool off to 20° C. to cause precipitation of BHET, followed by solid-liquid separation. Thus obtained cake was washed with cold toluene, and whereby refined cake contained 5.23 weight percent of toluene.

This wet BHET was molten at 120° C., and continuously fed into the drying agitation vessel employed in Example 1 which was maintained at 120° C., at such a rate that its average staying time in the vessel should become an hour. The vessel was maintained at substantially atmospheric pressure, and nitrogen gas was continuously blown thereinto from the bottom. The content of the vessel was continuously withdrawn to maintain the liquid level in the agitation tank constant. Thus obtained BHET contained 0.136 weight percent of toluene, and had an O.D. of 0.021.

The average partial pressure of the toluene vapor in the discharged gaseous mixture as calculated from the benzene obtained during the drying operation by condensation and the integrated flux of nitrogen gas was 0.42 atm.

This BHET was added with 0.030 mol percent of antimony trioxide to the BHET. After nitrogen substitution of inside atmosphere of the vessel containing the BHET, the vessel was immersed in a bath of 285° C. and maintained at atmospheric pressure for 30 minutes. Thereafter the pressure was gradually reduced to 1 mm Hg or somewhat less over the subsequent 30 minutes, followed by 60 minutes' polymerization under said condition. Thus, two hours after the immersion in the bath, the vacuum was broken with nitrogen gas, and the system was cooled to provide polymer. Thus obtained polymer exhibited excellent quality as demonstrated by the following data:

$[\eta]$:0.653 S.P.:262.4°Color tone: L:84.3 a:−0.5 b:−3.6

[COOH]:14.8 eq./10 g.

In the above, $[\eta]$ is the intrinsic viscosity of the product polyester measured at 35° C. in orthochlorophenol as the solvent; S.P. is the softening point of the polyester; and "L", "a", and "b" of color tone are the readings on color-difference meter in accordance with the indication table of ASTM 1482–57T.

EXAMPLES 8–15

15 parts of crude BHET synthesized from terephthalic acid and ethylene oxide and 85 parts of below-specified liquid medium were boiled at the boiling point of said medium, to cause complete dissolution of the BHET. If the BHET could not be completely dissolved, more medium was added. The system was then cooled to room temperature, and the precipitated BHET was separated. The liquid content of thus obtained wet BHET (on wet BHET basis) in each run was as shown in the table below.

Then the wet BHET was charged in the identical vessel with that employed in Example 1, immersed in an oil bath, and heated to 120° C. at atmospheric pressure to cause melting of the BHET.

Nitrogen gas was fed into the vessel from the bottom, at such a ratio that the average vapor pressure of the medium in the discharged gas should become 0.3 atm. 15 minutes thereafter the molten BHET was withdrawn, cooled and crystallized, and the product's liquid content was determined by means of gas chromatography, with the result shown in the table below. In said table, the run using xylene as the liquid medium was run at a reduced pressure of 100 mm Hg.

| Example Number | Type of medium | Liquid content of precipitated BHET (on wet BHET basis) | Liquid content of dry BHET (wt. percent) |
|---|---|---|---|
| 8 | Xylene | 43.2 | 0.090 |
| 9 | Chloroform | 36.1 | 0.008 |
| 10 | Acetonitrile | 53.2 | 0.105 |
| 11 | Acetone | 40.1 | 0.006 |
| 12 | Dioxane | 61.7 | 0.120 |
| 13 | Methyl acetate | 33.7 | 0.006 |
| 14 | Hexane | 41.5 | 0.008 |
| 15 | Cyclopentane | 38.2 | <0.005 |

EXAMPLES 16–21

An autoclave was charged with 83 parts of crude terephthalic acid, 430 parts of benzene, 44 parts of ethylene oxide, and 0.3 part of triethylamine, and after nitrogen substitution of its inside atmosphere, nitrogen was further introduced to a pressure of 10 kg/cm²G. The content was heated to 180° C. stirred for 10 minutes, then cooled with water to room temperature, and the reaction mixture was withdrawn to be separated into solid and liquid. The liquid content of thus obtained crude BHET was 43.1 weight percent (on wet BHET basis).

The wet BHET was charged in a vessel equipped with a stirrer, heated to the below-specified temperature in each run, kept in the molten state for the time specified also in the table below, thereafter withdrawn, and cooled. Thus crystallized BHET was each measured of its benzene content and O.D., with the results given in the same table.

| Ex. No. | Temp. for maintaining molten state of BHET (° C.) | Maintenance time of BHET at molten state (min.) | Benzene content of dry BHET (wt. percent) | O.D. of dry BHET | Oligomer content of dry BHET (wt. percent) |
|---|---|---|---|---|---|
| 16 | 108 | 180 | 0.531 | 0.252 | 1.15 |
| 17 | 130 | 60 | 0.095 | 0.255 | 1.20 |
| 18 | 150 | 10 | 0.072 | 0.267 | 2.56 |
| 19 | 170 | 8 | 0.043 | 0.297 | 3.62 |
| 20 | 180 | 7 | 0.010 | 0.321 | 7.92 |
| 21 | 130 | 300 | 0.080 | 0.335 | 10.55 |

The oligomer content of BHET was determined by means of liquid chromatography of the solution of BHET in dimethylformamide solvent. The oligomer content of the starting crude BHET was 1.02 percent.

EXAMPLE 22

An autoclave was charged with 100 parts of terephthalonitrile synthesized by vapor phase air oxidation of p-xylene in the presence of ammonia, 4,800 parts of ethylene glycol, 28 parts of water, 0.3 part of zinc acetate, and 0.3 part of trimethyl phosphate. Nitrogen gas was fed into the autoclave, and while driving the released ammonia gas outside the system, the system was reacted for 7 hours at 210° C. The resulting reaction mixture was cooled to room temperature, and then separated into crude BHET and ethylene glycol. The separation however was rather difficult, and the crude BHET contained 80.1 weight percent of the liquid (wet BHET basis).

This wet BHET was charged in the same vessel as employed in Example 1, and subjected to the identical drying procedure with that described in Example 2 at 130° C. Distillation of ethylene glycol completed within 18.5 minutes, and whereupon the molten BHET was withdrawn and cooled. The ethylene glycol remaining in the product was extracted with water and determined by means of gas chromatography, which was 0.31 weight percent.

EXAMPLE 23

Polyester waste yarn was washed with soapsuds, thoroughly rinsed with water, and dried. A vessel equipped with a reflux condenser was charged with 100 parts of thus dried waste yarn, together with 2,000 parts of ethylene glycol, and the content was boiled at the boiling point of ethylene glycol at atmospheric pressure for 3 hours. Thereafter the insoluble matter was hot-filtered, and remaining ethylene glycol solution containing BHET was cooled to 40° C. Thus separated precipitated BHET contained 48.3 weight percent of the liquid.

This wet BHET was dried in the identical manner with Example 2, except that the nitrogen gas was charged into the vessel from a lower part thereof, at such a rate to make the partial pressure of ethylene glycol vapor in the discharged gaseous mixture 0.4 atm.

The ethylene glycol content of thus obtained dry BHET was 0.075 weight percent.

EXAMPLES 24–25

A slurry composed of 83 parts of terephthalic acid, 44 parts of ethylene oxide, 288 parts of benzene, and 0.5 part of triethylamine as the catalyst was continuously fed into a tubular reactor of which temperature was controlled to be 180° C., at a rate of 10.56 parts per minute through a plunger pump. The tubular reactor was made of stainless steel pipe of 4 mm in diameter and 140 m in length, which was immersed in cylindrical water tank. The average staying time of the reaction liquid was 10 minutes.

The reaction mixture was taken out into a tank maintained at 110° C. and 1.4 kg/cm²G through an intermediate tank of the pressure controlled to be 20 kg/cm²G. During that procedure, the evaporated benzene was withdrawn from the system and recovered. Subsequently, the reaction mixture was continuously sent to a pressure filter to be removed of unreacted terephthalic acid, and wherefrom continuously sent to a precipitation tank maintained at the boiling point of benzene at atmospheric pressure. Thus precipitated BHET slurry was sent to a centrifugal machine to effect solid-liquid separation. Thus wet BHET containing 23.5 weight percent of the liquid was obtained, which was continuously bed into a melting tank at a rate of 13 kg/hr. The melting tank was a 50-liter capacity vessel equipped with a steam-heating jacket, heating coil at inside, and a guide cylinder at the center, thus forming a Pachuca tank. The inside temperature thereof was maintained at 120° C. at atmospheric pressure.

From the bottom of said vessel, nitrogen gas was supplied at a ratio specified in the table below for each run, and the gaseous mixture of nitrogen and benzene discharged from the upper part of the vessel was first led out of the system, and separated into benzene and nitrogen by means of a scrubber. The nitrogen gas was recirculated into the melting tank through a blower.

The average staying time of the BHET in the tank was 1 hour. The molten BHET was continuously withdrawn from the tank bottom, sent to a flaker, cold-molded, and recovered.

The benzene content and O.D. of the dry BHET in each run were as follows:

| Ex. No. | Nitrogen Gas Supply Rate (Nl/min.) | Calculated Partial pressure of BEnzene in Gaseous mixture (atm.) | Benzene Content of Molten, Dry BHET (wt. %) | O.D. of Molten, Dry BHET |
|---|---|---|---|---|
| 24 | 7 | 0.85 | 0.025 | 0.243 |
| 25 | 119.7 | 0.25 | 0.008 | 0.245 |

EXAMPLE 26

The wet BHET prepared in Example 23 was first melted by heating, and continuously supplied to upper part of a film evaporator manufactured by Luwa Co. The evaporator was a vertical cylinder equipped with a steam-heating jacket, maintained at 130° C. Nitrogen gas was supplied from a lower part thereof at such a rate that partial pressure of benzene vapor in the discharged gaseous mixture should become 0.4 atm. The inside pressure of the evaporator was controlled to be 100 mm Hg by means of a radiator. The evaporated benzene was led out of the system, condensed by a guard condenser, and recovered. The molten BHET withdrawn from a lower part of the evaporator was sent to a flaker to be cold-molded.

The resulting flaky BHET contained 0.0032 weight percent of benzene.

EXAMPLE 27

The recrystallization filtrate of 40° C. obtained by recrystallizing the crude BHET from water IN Example 1 was further cooled to 5° C. Whereby 20 parts of precipitated BHET was recovered. This wet BHET (liquid content: 35.2 weight percent was molten and dried in the identical manner with Example 1. The water content of the resulting dry BHET was 0.156 weight percent, and its O.D. was 0.236. terephthalate.

We claim:
1. A process for removing a volatile liquid medium from solid bis-($\beta$-hydroxyethyl) terephthalate wet with said volatile liquid medium and recovering dry bis-($\beta$-hydroxyethyl) terephthalate, which comprises heating and fusing solid bis-($\beta$-hydroxyethyl) terephthalate wet with a volatile liquid medium having a boiling point at normal pressure not lower than 40° C. but lower than the boiling point of ethylene glycol into a molten mass, and evaporating said volatile liquid medium from the melt without causing degradation of said bis-($\beta$-hydroxyethyl) terephthalate.

2. The process of claim 1, wherein said volatile liquid medium is evaporated from the melt of wet, solid bis-($\beta$-hydroxyethyl) terephthalate which is maintained at the molten state at temperatures not higher than 180° C.

3. The process of claim 1 wherein said volatile liquid medium is selected from the group consisting of benzene, toluene, and xylene.

4. The process of claim 1 wherein said bis-($\beta$-hydroxyethyl) terephthalate is that obtained by reaction of terephthalic acid with ethylene oxide.

5. The process of claim 1 wherein said melt is contacted with a flow of inert gas.

* * * * *